US011628570B2

(12) United States Patent
Narusawa (10) Patent No.: US 11,628,570 B2
(45) Date of Patent: Apr. 18, 2023

(54) ROBOT MANAGEMENT SYSTEM AND CONTROL METHOD FOR ROBOT MANAGEMENT SYSTEM

(71) Applicant: Seiko Epson Corporation, Tokyo (JP)

(72) Inventor: Atsushi Narusawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 298 days.

(21) Appl. No.: 16/886,834

(22) Filed: May 29, 2020

(65) Prior Publication Data

US 2020/0376652 A1 Dec. 3, 2020

(30) Foreign Application Priority Data

May 30, 2019 (JP) .............................. JP2019-101032

(51) Int. Cl.
*B25J 9/16* (2006.01)
*G06F 11/14* (2006.01)
*G05B 23/02* (2006.01)

(52) U.S. Cl.
CPC ........ *B25J 9/1674* (2013.01); *G05B 23/0264* (2013.01); *G05B 23/0272* (2013.01); *G06F 11/1448* (2013.01); *G06F 11/1458* (2013.01); *G06F 2201/84* (2013.01)

(58) Field of Classification Search
None
See application file for complete search history.

(56) References Cited

U.S. PATENT DOCUMENTS

| 2004/0103168 A1 | 5/2004 | Dalton et al. |
| 2014/0143610 A1 | 5/2014 | Nakatsugawa et al. |
| 2016/0149996 A1 | 5/2016 | Eckert et al. |
| 2016/0371154 A1 | 12/2016 | Makimoto et al. |

FOREIGN PATENT DOCUMENTS

| JP | H02-081203 A | 3/1990 |
| JP | 2006281421 A | 10/2006 |
| JP | 2007190663 A | 8/2007 |
| JP | 2014102636 A | 6/2014 |
| JP | 2016-100026 A | 5/2016 |
| JP | 2017-217734 A | 12/2017 |
| WO | 2016071974 A1 | 5/2016 |

*Primary Examiner* — Carlos R Ortiz Rodriguez
(74) *Attorney, Agent, or Firm* — Yu Gang (57) ABSTRACT

A robot management system includes a control device including a robot control section configured to control a robot, a program storing section configured to store a program for controlling the robot, and a backup generating section configured to generate backup data of the program and a managing device coupled to the control device and configured to manage the control device. The managing device includes an acquiring section configured to acquire generation time when the backup generating section generates the backup data and a display control section configured to, when a difference between the generation time and present time is equal to or larger than a first predetermined value, cause a display section to display notification content.

7 Claims, 10 Drawing Sheets

ROBOT MANAGEMENT SYSTEM AND CONTROL METHOD FOR ROBOT MANAGEMENT SYSTEM

The present application is based on, and claims priority from JP Application Serial Number 2019-101032, filed May 30, 2019, the disclosure of which is hereby incorporated by reference herein in its entirety.

BACKGROUND

1. Technical Field

The present disclosure relates to a robot management system and a control method for the robot management system.

2. Related Art

An industrial robot that performs work such as holding, conveyance, and assembly of a target object has been widely spread. The operation of such an industrial robot is controlled by a program stored in a robot controller. A work procedure and operation content are specified in the program. The industrial robot can perform the work by executing the program.

For example, JP-A-2017-217734 (Patent Literature 1) discloses a robot control device including a control section that outputs a control signal to a robot and a storing section including a program storing section. The robot control device includes a backup storage section and a backup-storage processing section. The backup-storage processing section has a function of performing backup storage for a program stored in the backup storage section. With such a function, it is possible to effectively prevent loss of a program.

For example, when a program stored in the program storing section is lost because of some cause, the program is restored using the program stored in the backup storage section. Accordingly, the backup storage of the program described in Patent Literature 1 is desirably performed as frequently as possible. However, when a long time has elapsed from time of the backup storage because, for example, a user forgot the backup storage, a significant difference occurs between the lost program and the program for which the backup storage is performed. Then, it is sometimes difficult to restore the lost program to an effective state.

SUMMARY

A robot management system according to an application example of the present disclosure includes: a control device including: a robot control section configured to control a robot; a program storing section configured to store a program for controlling the robot; and a backup generating section configured to generate backup data of the program; and a managing device coupled to the control device and configured to manage the control device. The managing device includes: an acquiring section configured to acquire generation time when the backup generating section generates the backup data; and a display control section configured to, when a difference between the generation time and present time is equal to or larger than a first predetermined value, cause a display section to display notification content.

DESCRIPTION OF EXEMPLARY EMBODIMENTS

Preferred embodiments of the present disclosure are explained in detail below with reference to the accompanying drawings.

1. First Embodiment

First, a first embodiment is explained.

Figure 1:
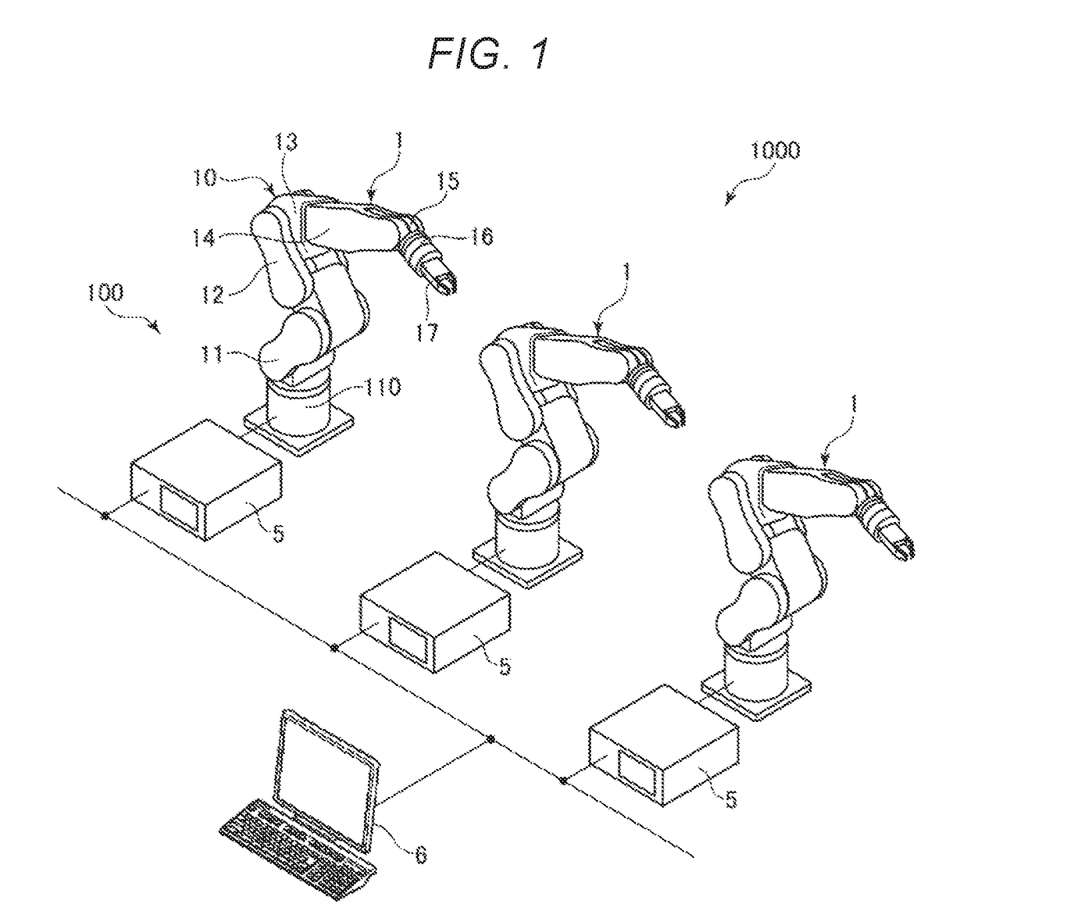
FIG. 1 is a perspective view showing a robot management system according to a first embodiment.
Figure 2:
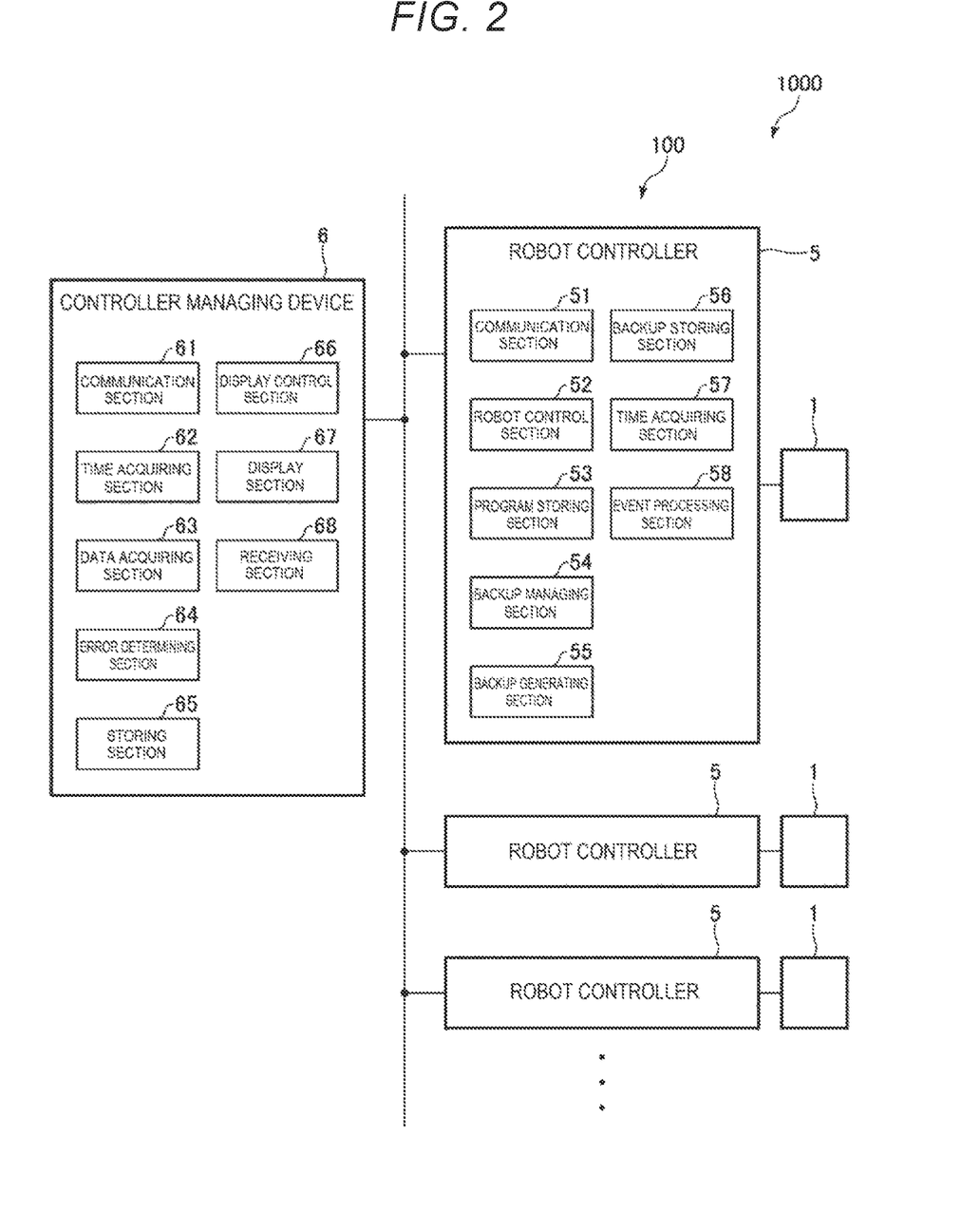
FIG. 2 is a functional block diagram showing the robot management system shown in FIG. 1.
Figure 3:
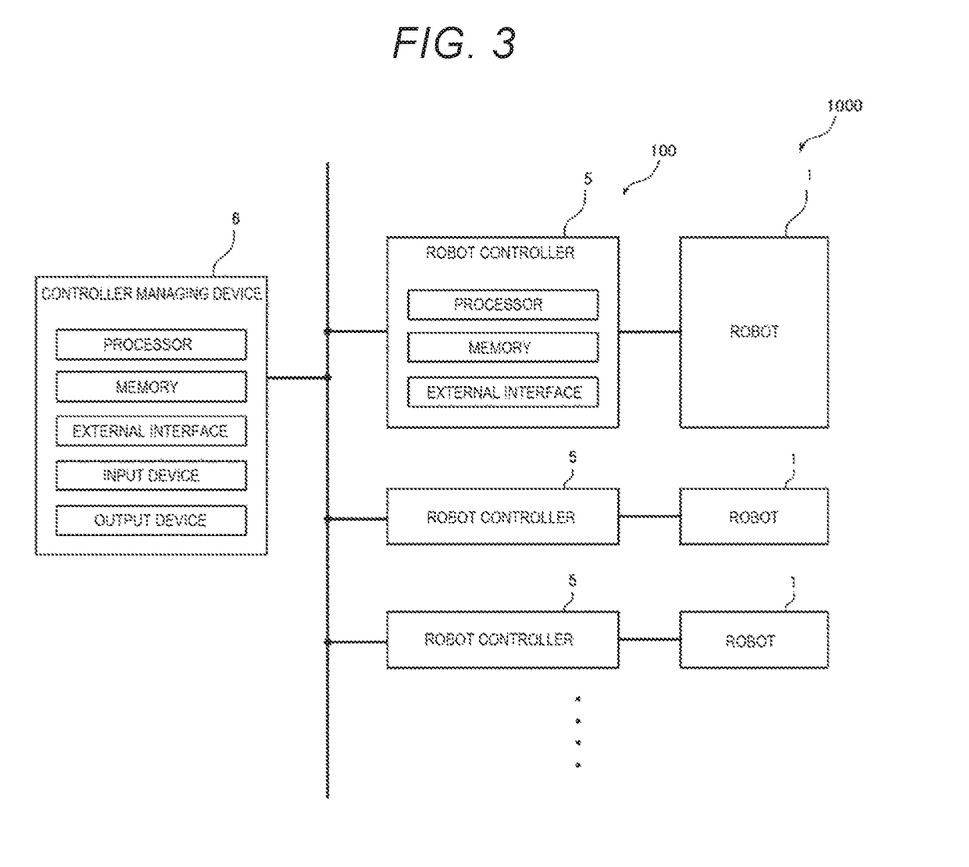
FIG. 3 is a conceptual diagram showing an example of a hardware configuration for realizing functions of the robot management system shown in FIG. 2.

FIG. 1 is a perspective view showing a robot management system according to the first embodiment. FIG. 2 is a functional block diagram showing the robot management system shown in FIG. 1. FIG. 3 is a conceptual diagram showing an example of a hardware configuration for realizing functions of the robot management system shown in FIG. 2.

In this specification, "couple" includes both of direct connection and indirect connection via any member.

1.1 Robot Management System

A robot management system 100 shown in FIG. 1 includes robot controllers 5 configured to control driving of robots 1 and a controller managing device 6 configured to manage the robot controllers 5.

Such a robot management system 100 is coupled to the robots 1 to thereby control driving of the robots 1, which are manipulators. Consequently, the robots 1 can perform various kinds of work, for example, work such as holding, conveyance, and assembly of a work target object.

A robot system 1000 shown in FIG. 1 is configured by such a robot management system 100 and at least one robot 1 coupled to the robot management system 100. The robot management system 100 shown in FIG. 1 includes a plurality of robot controllers 5, which are coupled to one controller managing device 6. The robots 1 are respectively coupled to the robot controllers 5.

These sections are made communicable by wire or radio. The communication may be performed via a network via the Internet.

As shown in FIG. 2, the robot controller 5 according to this embodiment includes a robot control section 52 configured to control the robot 1, a program storing section 53 configured to store a program for controlling the robot 1, and a backup generating section 55 configured to generate backup data of the program.

Further, the controller managing device 6 according to this embodiment includes a time acquiring section 62 configured to acquire generation time when the backup generating section 55 generates the backup data and a display control section 66 configured to, when a difference between the generation time and present time is equal to or larger than a first predetermined value, cause a display section 67 to display notification content for indicating to that effect or urging execution of backup processing.

With such a robot management system 100, based on the difference between the generation time when the backup data is generated and the present time, when a predetermined time has elapsed from the generation of the backup data, it is possible to perform display for informing a user to that effect. Consequently, it is possible to prevent a frequency of the backup processing from decreasing and generate and store effective backup data. As a result, when a deficiency such as a loss of a program occurs, it is possible to easily perform restoration work to an appropriate state.

The sections of the robot management system 100 are explained in detail below.

1.1.1 Robot

The robot 1 shown in FIG. 1 is a so-called six-axis vertical articulated robot and includes a base 110 and a robot arm 10 coupled to the base 110.

The base 110 is a portion for attaching the robot 1 to any setting place. In other words, the base 110 couples the setting place and the robot arm 10.

As shown in FIG. 1, the robot arm 10 includes an arm 11, an arm 12, an arm 13, an arm 14, an arm 15, and an arm 16. These arms 11 to 16 are coupled in this order from the proximal end side of the robot arm 10, that is, the base 110 side to the distal end side of the robot arm 10, that is, the opposite side of the base 110. The arms 11 to 16 are capable of turning with respect to arms adjacent thereto or the base 110. For example, the arm 16 is formed in a disk shape as shown in FIG. 1 and is capable of turning with respect to the arm 15.

As shown in FIG. 1, a gripping hand 17, which grips a work target object, is coupled to the distal end of such a robot arm 10. The gripping hand 17 is replaceable. A suction hand, a magnetic hand, a screwing tool, an engaging tool, or the like may be used instead of the gripping hand 17.

The robot 1 includes driving sections including not-shown motors configured to turn one arm with respect to the other arm or the base 110 and not-shown speed reducers. The robot 1 includes not-shown position sensors configured to detect rotation angles of rotation axes of the motors or the speed reducers. The driving sections and the position sensors are provided in, for example, the base 110 and the arms 11 to 16 and enable the arms 11 to 16 to be driven independently from one another. The driving sections and the position sensors are respectively electrically coupled to the robot controllers 5.

Besides, any other members, equipment, and the like may be provided in the robot 1. Specifically, examples of the members, the equipment, and the like include an imaging section configured to image the work target object, the robot 1, or the periphery of the robot 1 and various sensors such as a force sensor configured to detect an external force applied to the robot 1.

The number of arms of the robot 1 may be one to five or may be seven or more. The robot 1 may be a SCARA robot or may be a double-arm robot including two or more robot arms 10.

1.1.2 Robot Controller

The robot controller 5 shown in FIG. 2 has a function of controlling driving of the robot 1 and is communicably coupled to the robot 1 corresponding to the robot controller 5.

The robot controller 5 shown in FIG. 2 includes a communication section 51, the robot control section 52, the program storing section 53, a backup managing section 54, the backup generating section 55, a backup storing section 56, a time acquiring section 57, and an event processing section 58. These sections are communicably coupled to one another.

The functions of such a robot controller 5 can be realized by, for example, the hardware configuration shown in FIG. 3.

The robot controller 5 shown in FIG. 3 includes a processor, a memory, and an external interface communicably coupled to one another.

Examples of the processor shown in FIG. 3 include a CPU (Central Processing Unit).

Examples of the memory shown in FIG. 3 include a volatile memory such as a RAM (Random Access Memory) and a nonvolatile memory such as a ROM (Read Only Memory). The memory is not limited to an undetachable type and may be a detachable external storage device.

Further, examples of the external interface shown in FIG. 3 include various connectors for communication. Examples of the connectors for communication include a USB (Universal Serial Bus) connector, an RS-232C connector, and a wired LAN (Local Area Network). The external interface may be a transceiver capable of performing wireless communication such as a wireless LAN.

The robot controller 5 may further include other hardware components in addition to the components explained above.

The sections of the robot controller 5 shown in FIG. 2 are explained.

The communication section 51 performs communication between the robot controller 5 and the robot 1 corresponding to the robot controller 5 and communication between the robot controller 5 and the controller managing device 6.

The robot control section 52 executes various programs and the like stored in the program storing section 53. Consequently, processing such as control of driving of the robot 1, various arithmetic operations, and various determinations are realized. As an example, the robot control section 52 controls driving of the driving section to thereby drive the robot arm 10 and the gripping hand 17, grip a work target object, and performs conveyance, assembly, and the like.

The program storing section 53 stores programs to be executed by the robot control section 52. The programs are prepared for each work content and are stored in a state in which the programs can be updated at any time. The program storing section 53 may be configured to store data other than the programs. Examples of the data other than the programs include setting information of the robot controller 5, an error occurrence history of the robot 1, and an error occurrence history of the robot controller 5.

The backup managing section 54 manages backup processing by the backup generating section 55. Specifically, when the backup generating section 55 generates backup data, the backup managing section 54 stores generation time of the backup data in the backup storing section 56 in association with the backup data. The controller managing device 6 explained below collects information including the generation time as a notification from the robot controller 5 and manages the backup processing. This notification may be output from the backup managing section 54 to the controller managing device 6.

Figure 4:
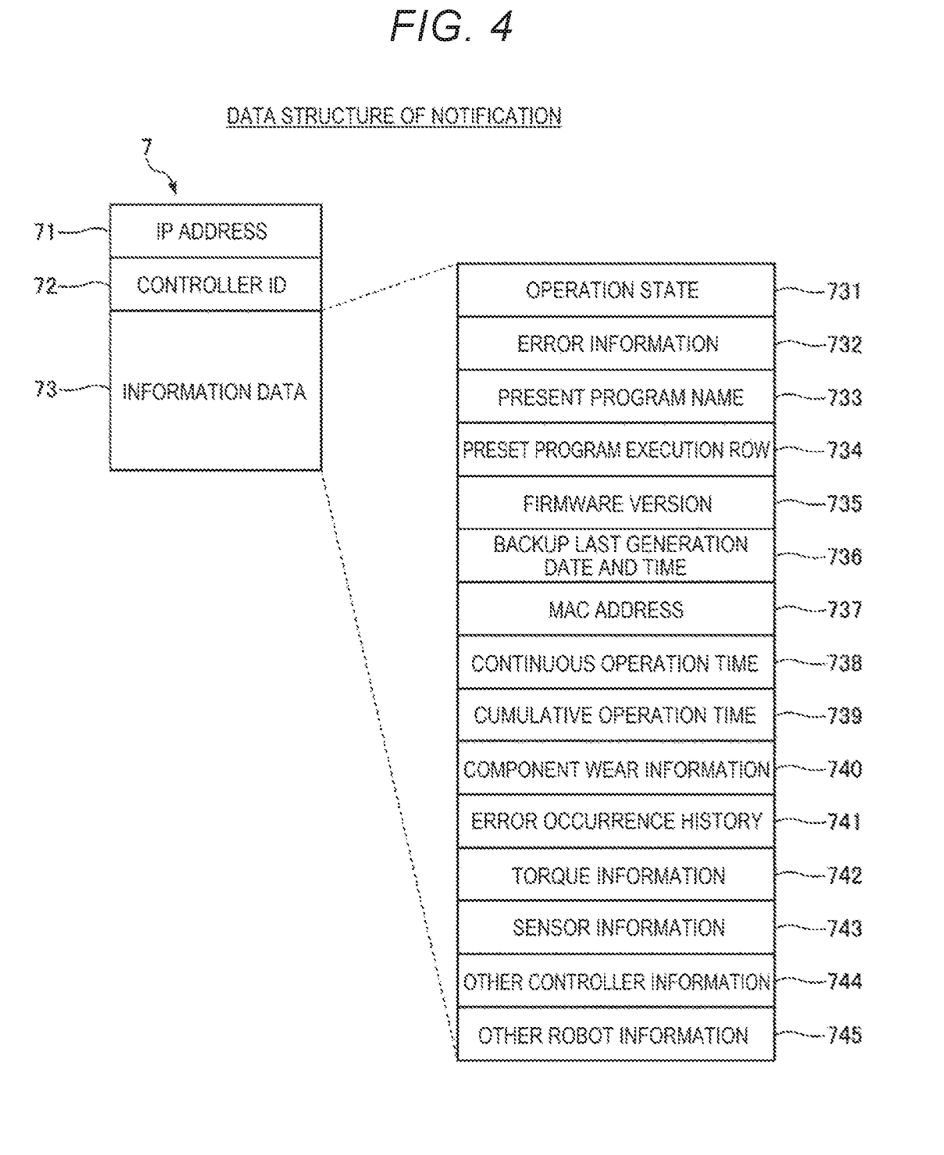
FIG. 4 is a conceptual diagram showing an example of content of a notification acquired by a controller managing device.
Figure 5:
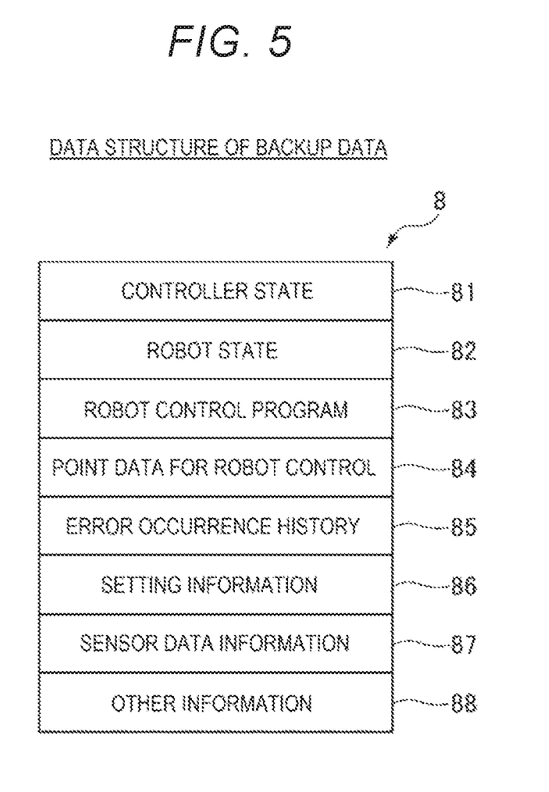
FIG. 5 is a conceptual diagram showing an example of content of backup data.

FIG. 4 is a conceptual diagram showing an example of content of a notification 7 acquired by the controller managing device 6. FIG. 5 is a conceptual diagram showing an example of content of backup data 8.

The notification 7 received by the controller managing device 6 may have data structures of various forms corresponding to communication standards. In FIG. 4, an example of a packet or a frame for communication to which an IP address is given is shown.

The notification 7 shown in FIG. 4 includes an IP address 71, a controller ID 72, and information data 73.

IP means an Internet Protocol. The IP address 71 includes, for example, both of an address of a transmission source of the notification 7 and an address of a transmission destination of the notification 7. The controller ID 72 includes an ID (an identification number) peculiar to the robot controller 5 at the transmission source of the notification 7. The information data 73 includes various kinds of information concerning the robot 1 and the robot controller 5.

An example of content of the information data 73 is shown in FIG. 4. The information data 73 shown in FIG. 4 includes an operation state 731 of the robot 1 and the robot controller 5, error information 732 of the robot 1 and the robot controller 5, a program name 733 of a program currently executed by the robot control section 52, a program execution row 734 of the program currently executed by the robot control section 52, version information 735 of firmware for controlling the robot controller 5, a last generation date and time 736 of the backup data 8 by the backup generating section 55, a MAC (Media Access Control) address 737 of the communication section 51, a continuous operation time 738 of the robot 1 and the robot controller 5, a cumulative operation time 739 of the robot 1 and the robot controller 5, component wear information 740 of the robot 1, an error occurrence history 741 of the robot 1 and the robot controller 5, torque information 742 of the robot 1, and sensor information 743 of the robot 1.

The operation information 731 is information indicating, for example, when the robot 1 and the robot controller 5 have a plurality of operation modes, in which mode the robot 1 and the robot controller 5 are operating. The operation state 731 is information such as working, stopped, temporary stop, and emergency stop.

The torque information 742 of the robot 1 is, for example, a current value of an electric current flowing to the motor of the driving section of the robot 1.

Further, the sensor information 743 of the robot 1 is data received from not-shown various sensors such as a position sensor, a force sensor, a pressure sensitive sensor, a proximity sensor, a temperature sensor, and a vibration sensor included in the robot 1 or the robot controller 5.

The information data 73 may include, as information other than the above, other controller information 744 and other robot information 745.

The notification 7 may include information other than the above. A part of the components of the notification 7 explained above may be omitted.

The backup generating section 55 generates, based on a command output from the event processing section 58 explained below, the backup data 8 of the programs and the various data stored in the program storing section 53. The backup data 8 includes content capable of restoring the programs and the various data at that point in time. The generated backup data 8 is stored in the backup storing section 56.

The backup data 8 shown in FIG. 5 includes, as components, a controller state 81, a robot state 82, a robot control program 83, point data for robot control 84, an error occurrence history 85, setting information 86, sensor data information 87, and other information 88.

The controller state 81 includes, for example, data stored in the memory such as the RAM, version information of firmware, error information, warning information, and information indicating a coupling state to the outside at the time when the robot controller 5 is operating.

The robot state 82 includes, for example, torque information, sensor information, and the like of the robot 1.

Further, the robot control program 83 includes, for example, besides the programs stored in the program storing section 53, information indicating an execution state of the programs, for example, a project name, an execution row number, and a variable value. The robot control program 83 may be a program source code or may be a machine language after compile.

The point data for robot control 84 includes, for example, position information for teaching the operation of the robot 1.

Further, the error occurrence history 85 is, for example, an occurrence history of errors in the robot 1 and the robot controller 5. The error occurrence history 85 includes at least an occurrence date and time and error content such as an error code. A data format of the error occurrence history 85 is, for example, a text format in which element data is arrayed.

The setting information 86 includes, for example, setting values concerning various settings of the robot controller 5.

Further, the sensor data information 87 is, for example, data received from the various sensors and is preferably sampling data from the various data represented in a binary format. By including these data in the backup data 8, it is possible to prevent an opportunity for performing an operation analysis afterwards from being lost.

Examples of the other information 88 include, for example, when the event processing section 58 outputs a command to generate the backup data 8, content of a trigger for the output of the command.

A data format of the backup data 8 is not particularly limited. Examples of the data format of the backup data 8 include a CSV (Comma Separated Value) format, an XML (Extensible Markup Language) format, and a JSON (Java Script (registered trademark) Object Notation) format.

A file format of the backup data 8 may be a format of a file aggregate in which the components are present as individual files or may be a format in which the components are packaged as one file.

A part of the components of the backup data 8 may be omitted or the backup data 8 may additionally include other components.

The backup storing section 56 stores the backup data 8 generated by the backup generating section 55. The backup storing section 56 may be provided in a place other than the robot controller 5, for example, the controller managing device 6 or a not-shown data server. The backup data 8 may be data including only a part of the programs and only a part of information other than the programs if the programs and the like can be restored. Further, the backup data 8 may be stored for each generation time and may be stored in a state in which data at any generation time can be read out.

The time acquiring section 57 acquires a date and time when the backup data 8 is generated. The date and time may be a date and time acquired from, for example, an internal clock included in the robot controller 5 or the controller managing device 6 or may be a date and time acquired from a time server via the Internet. Time to be acquired may be original time applied to the controller managing device 6 and the robot controller 5. That is, the time to be acquired does not need to be general time represented by day, hour, minute, and second and may be time clocked at any interval from any point in time. The acquired date and time is associated with the backup data 8 by the backup managing section 54.

The event processing section 58 outputs backup generation information toward the backup generating section 55. The backup generation information is a trigger for executing the backup processing. For example, the event processing section 58 collects events on the inside of the robot controller 5 or events on the outside of the robot controller 5. The backup generation information is output based on the events.

Specifically, examples of the events on the inside of the robot controller 5 include an event that periodically occurs at a predetermined time interval, an event involved in a stop or a pause of the operation of the robot 1, an event involved in occurrence of an error or waring in the robot 1 or the robot controller 5, an event that occurs when a variable value of a program satisfies a fixed condition, as a specific example, deviates from a normal value, an event involved in coupling of an external storage device to the robot controller 5, an event involved in operation of a user interface such as an operation button or an operation panel coupled to the robot controller 5, and an event involved in update of the robot control program 83 or the point data for robot control 84.

Examples of the event on the outside of the robot controller 5 include a command for executing the backup processing output from the controller managing device 6.

1.1.3 Controller Managing Device

The controller managing device 6 shown in FIG. 2 is coupled to a plurality of robot controllers 5 and collectively manages the robot controllers 5. The controller managing device 6 may be coupled to one robot controller 5.

The controller managing device 6 shown in FIG. 2 includes a communication section 61, the time acquiring section 62, a data acquiring section 63, an error determining section 64, a storing section 65, the display control section 66, the display section 67, and a receiving section 68. These sections are communicably coupled to one another.

The functions of such a controller managing device can be realized by, for example, the hardware configuration shown in FIG. 3.

The controller managing device 6 shown in FIG. 3 includes a processor, a memory, an external interface, an input device, and an output device communicably coupled to one another.

Examples of the processor shown in FIG. 3 include a CPU (Central Processing Unit).

Examples of the memory shown in FIG. 3 include a volatile memory such as a RAM (Random Access Memory) and a nonvolatile memory such as a ROM (Read Only Memory). The memory is not limited to a non-detachable type and may be a detachable external storage device.

Further, examples of the external interface shown in FIG. 3 include various connectors for communication. Examples of the various connectors for communication include a USB (Universal Serial Bus) connector, an RS-232C connector, and a wired LAN (Local Area Network). The external interface may be a transceiver that enables wireless communication such as a wireless LAN.

Examples of the input device shown in FIG. 3 include a keyboard and a touch panel. Examples of the output device shown in FIG. 3 include a monitor.

The robot controller 5 may further include other hardware components in addition to the components explained above.

The sections of the controller managing device 6 shown in FIG. 2 are explained.

The communication section 61 performs communication between the controller managing device 6 and the robot controllers 5.

The time acquiring section 62 acquires present time. This time may be a date and time acquired from, for example, an internal clock included in the controller managing device 6 or may be a date and time acquired from a time server via the Internet. Time to be acquired may be original time applied to the controller managing device 6 and the robot controller 5. That is, the time to be acquired does not need to be general time represented by day, hour, minute, and second and may be time clocked at any interval from any point in time.

The data acquiring section 63 periodically acquires data such as the notification 7 shown in FIG. 4 from the robot controller 5. The entire notification 7 may be stored in the backup storing section 56 or content of the notification 7 may be individually stored in different places and collected by the data acquiring section 63. The acquired data is stored in the storing section 65. When the controller managing device 6 is coupled to the plurality of robot controllers 5, the notifications 7 and the robot controllers 5 are stored in an associated state based on controller IDs 72 or the like included in the notifications 7.

The error determining section 64 reads out the notification 7 stored in the storing section 65. The error determining section 64 compares the last generation date and time 736 of the backup data 8 included in the notification 7 and the present date and time acquired by the time acquiring section 62. When a difference between the last generation date and time 736 and the present date and time is equal to or larger than a first predetermined value, the error determining section 64 generates backup time error information. The backup time error information is output to the display control section 66.

The storing section 65 stores the data collected by the data acquiring section 63, data received by the receiving section 68, the first predetermined value specified in advance concerning the difference between the last generation date and time 736 and the present time, and the like.

The display control section 66 causes, based on the backup time error information generated by the error determining section 64, the display section 67 to display any notification content.

The display section 67 displays the any notification content based on a signal from the display control section 66.

The receiving section 68 receives, from the outside, the first predetermined value or the like used by the error determining section 64 in generating the backup time error information. The receiving section 68 stores the received first predetermined value in the storing section 65.

1.2 Control Method for the Robot Management System

A control method for the robot management system 100 is explained.

Figure 6:
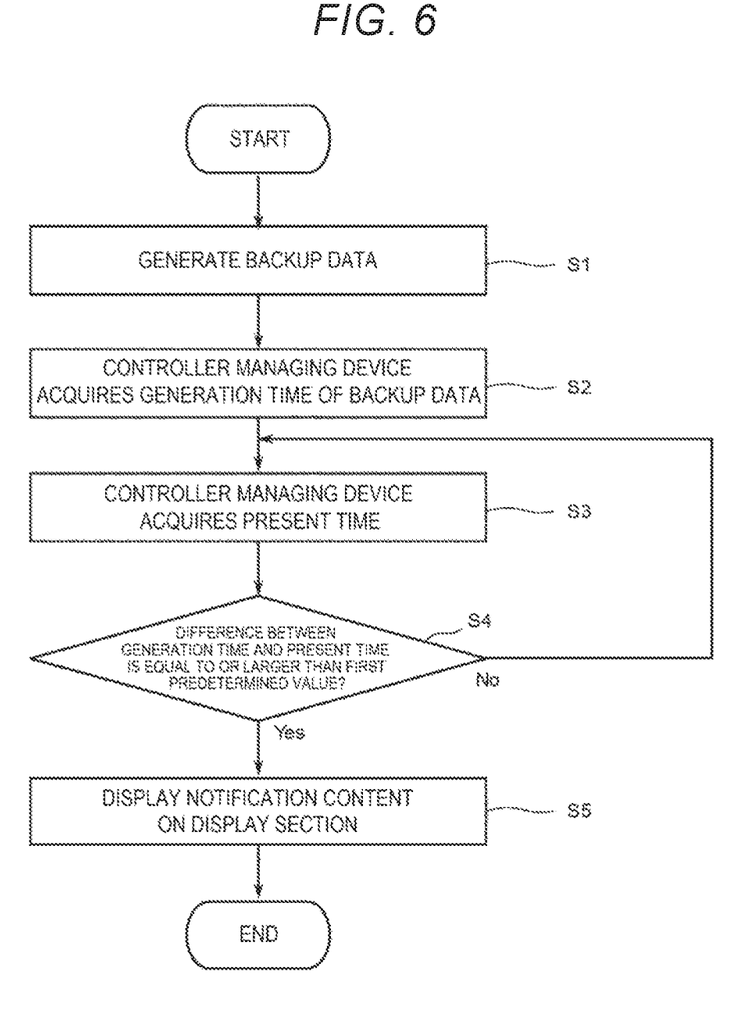
FIG. 6 is a flowchart showing a control method for the robot management system according to the first embodiment.

FIG. 6 is a flowchart showing a control method for the robot management system according to the first embodiment.

In step S1 in FIG. 6, the event processing section 58 generates backup generation information and outputs the backup generation information to the backup generating section 55. The backup generating section 55, which receives the backup generation information, generates the backup data 8 and stores the backup data 8 in the backup storing section 56. The time acquiring section 57 acquires a date and time when the backup data 8 is generated and stores the date and time in the backup storing section 56.

The backup generating section 55 preferably generates the backup data 8 when the operation of the robot is stopped. By generating the backup data 8 at such timing, when programs and other information are included in the backup data 8, information acquired in a state with less change can be included in the backup data 8. Consequently, effectiveness of the backup data 8 can be further improved. However, the generation of the backup data 8 is not limited to when the operation of the robot 1 is stopped.

In step S2 in FIG. 6, the controller managing device 6 acquires the notification 7 stored in the backup storing section 56. Since the notification 7 includes the last creation date and time of the backup data 8 as explained above, the generation time of the backup data 8 is acquired by the controller managing device 6.

In step S3 shown in FIG. 6, the time acquiring section 62 of the controller managing device 6 acquires present time.

In step S4 in FIG. 6, the error determining section 64 of the controller managing device 6 compares the generation time of the backup data 8 and the present time. The error determining section 64 determines whether the difference between the generation time and the present time is equal to or larger than a first predetermined value.

When the difference is equal to or larger than the first predetermined value, processing shifts to step S5. In step S5, the display control section 66 causes the display section 67 to display notification content. Examples of the notification content include the fact that the difference between the generation time and the present time is equal to or larger than the first predetermined value and guidance for update of the backup data 8. By performing such display, it is possible to urge the user to perform update operation for the backup data 8.

Consequently, effective backup data 8 can be secured. Even when a program or the like is lost, the backup data 8 can be restored to an effective state, that is, a normal state before the program or the like is lost. As a result, a downtime of the robot 1 can be minimized.

On the other hand, when the difference is smaller than the first predetermined value, it is possible to regard that the stored backup data 8 is relatively new and does not need to be immediately updated. Accordingly, the processing returns to step S3.

Last generation date and times of the backup data 8 are preferably displayed as a list on the display section concerning the plurality of robot controllers 5.

Consequently, the plurality of robot controllers 5 can be collectively managed. Therefore, efficiency of management can be improved.

In that case, the notification content may be content indicating that, for example, a display color of the last generation date and time of the backup data 8 equal to or larger than the first predetermined value is changed, characters of the last generation date and time are reversely displayed, the characters are flashed, or a character font of the last generation date and time is changed.

The first predetermined value affects a frequency of urging the update of the backup data 8. Therefore, the first predetermined value only has to be set as short as possible in order to maintain the backup data 8 in the latest state. On the other hand, when the predetermined value is too short, the update of the backup data 8 is too frequently performed and takes time. Accordingly, by setting the first predetermined value as appropriate, it is possible to optimize the frequency of the update of the backup data 8.

Since a specific first predetermined value is different depending on a situation, it cannot be said definitely, but, preferably, the first predetermined value is approximately one hour or more and ten days or less and, more preferably, approximately three hours or more and three days or less. Consequently, it is possible to secure the backup data 8 in an effective state while reducing a load of the robot management system 100.

Accordingly, it is preferable that the user can set the first predetermined value according to a target frequency of the update of the backup data 8. Therefore, as explained above, the controller managing device 6, which is the managing device according to this embodiment, includes the receiving section 68 configured to receive the first predetermined value from the outside. Consequently, the user can optionally set the first predetermined value.

In step S2, the controller managing device 6 preferably periodically acquires the notification 7. Consequently, the generation time of the backup data 8 can also be periodically acquired. It is possible to frequently confirm whether the update of the backup data 8 is necessary. Accordingly, it is possible to prevent a decrease in the effectiveness of the backup data 8 involved in a decrease in the frequency of the confirmation.

For example, the frequency of acquiring the notification 7 is preferably once or more in thirty minutes, more preferably once or more in five minutes, and still more preferably once or more in one minute. By acquiring the notification 7 in such a frequency, the update frequency of the backup data 8 increases. Therefore, it is possible to particularly increase the effectiveness of the backup data 8.

The data acquiring section 63, which is an acquiring section of the controller managing device 6, may acquire, as the notification 7, other information in addition to the last generation date and time of the backup data 8. For example, as explained above, the data acquiring section 63 may have a function of acquiring at least one kind information among the continuous operation time 738 of the robot 1, the cumulative operation time 739 of the robot 1, the component wear information 740 of the robot 1, the error occurrence history 741 of the robot 1, the torque information 742 of the robot 1, and the sensor information 743 of the robot 1. The controller managing device 6 may have a function of changing, based on these kinds of information acquired by the data acquiring section 63, a period when the backup generating section 55 generates the backup data 8.

A pattern for changing the period is not particularly limited. Examples of a pattern for changing the period include a pattern for changing the period to advance timing when the generation of the backup data 8 is scheduled. Since the data acquiring section 63 has such a function, the controller managing device 6 can predict based on the information included in the notification 7 that the setting of the robot controller 5 greatly changes or a probability of occurrence of a deficiency in the robot 1 in near future increases. When the setting change or the increase in the probability occurs, the various kinds of information stored in the robot controller 5 greatly change. Therefore, considering subsequent stable operation of the robot controller 5, it is desired to execute the backup processing as early as possible.

Therefore, in this embodiment, for example, the period when the backup data 8 is generated can be advanced, that is, the first predetermined value can be reduced based on these kinds of information. Consequently, the robot controller 5 can find, during an early stage, a situation in which backup is necessary and urge the user to execute the backup processing before a problem such as a loss of a program occurs.

The advancing the generation period for the backup data 8 is an example of a changing pattern. The generation period may be delayed.

Further, the controller managing device 6, which is a managing device according to this embodiment, may change the generation period for the backup data 8, that is, the first predetermined value based on a specific change of these kinds of information.

As an example, it is assumed that the data acquiring section 63 has a function of acquiring the various kinds of information explained above respectively at certain first time and second time after the first time. In this case, the controller managing device 6 compares information acquired at the first time and information acquired at the second time and, when a change amount of the information is equal to or larger than a second predetermined value, changes the period when the backup generating section 55 generates the backup data 8. Specifically, the controller managing device 6 reduces the first predetermined value to resultantly output a command for executing the backup processing early to the event processing section 58. With such a function, it is possible to find, earlier and more surely, a situation in which backup is necessary. As a result, it is possible to urge the user to more surely execute the backup processing before a problem such as a loss of a program occurs.

The second predetermined value is set as appropriate based on, for example, a result value of the information explained above at the time when the operation of the robot controller 5 becomes unstable or a condition under which maintenance is necessary. For example, when there is a result indicating that the behavior of the robot controller 5 becomes unstable if the continuous operation time 738 of the robot 1 is equal to or longer than a certain time, the time only has to be set as the second predetermined value. When a replacement condition due to a wear amount of a component of the robot 1 is determined, since maintenance work necessarily follows, the replacement condition may be set as the second predetermined value.

As explained above, in step S5, the display control section 66 causes the display section 67 to display the notification content. Further, after step S5, the processing may shift to update work for the backup data 8. In that case, the controller managing device 6 may be able to support easy shift according to selection of the last generation data and time 736 of the backup data 8 displayed on the display section 67. For example, the display section 67, on which the last generation date and time 736 is displayed, may shift to an operation screen for the update work when the user sets a cursor of an input device on the last generation date and time 736 and clicks the last generation date and time 736. Consequently, since the user can intuitively shift the display section 67, the user can more easily perform the update work for the backup data 8.

In that case, it is preferable to set the backup data 8 to be updated after reception of a notification of an event involved in a stop or a pause of the operation of the robot 1 rather than immediately updating the backup data 8 according to setting in the event processing section 58 of the robot controller 5.

From such a viewpoint, a time required for generating the backup data 8 may be displayed on the display section 67 in addition to the notification content explained above. That is, since it is desirable to stop the operation of the robot 1 while the backup data 8 is generated, when the time required for the generation is displayed, the user can easily take timing for shifting to the update work for the backup data 8. Consequently, a downtime of the robot 1 can be minimized.

Further, when the backup generating section 55 generates the backup data 8, the backup generating section 55 may generate the backup data 8 while the operation of the robot 1 is stopped. However, the backup generating section 55 may output stop instruction information for stopping the operation of the robot 1 to the robot control section 52. Consequently, the operation of the robot 1 can be stopped at any timing. It is easy to generate the backup data 8.

In this case, the operation of the robot 1 is automatically stopped following the generation of the backup data 8. However, the user may instruct the robot 1 to stop the operation. In other words, the controller managing device 6 according to this embodiment may have two operation modes, that is, a "manual mode" in which the user performs the update work for the backup data 8 and also stops the operation of the robot 1 and a "semiautomatic mode" in which the user performs the update work and the operation of the robot 1 is automatically stopped.

As explained above, the control method for the robot management system 100 according to this embodiment is a method of controlling the robot management system 100 including the robot controller 5, which is a control device configured to control the robot 1, and the controller managing device 6, which is a managing device coupled to the robot controller 5 and configured to manage the robot controller 5. The control method includes step S1 in which the robot controller 5 generates the backup data 8 of the program for controlling the robot 1, step S2 in which the controller managing device 6 acquires, from the robot controller 5, generation time when the backup data 8 is generated, and step S5 in which, when a difference between the generation time and present time is equal to or larger than a first predetermined value, the controller managing device 6 causes the display section 67 to display notification content.

With such a control method, the display section 67 can display and inform the user to the effect that, for example, it is necessary to update the backup data 8. Consequently, it is possible to urge update operation for the backup data 8 by the user and urge the user to update the backup data 8. In other words, the display section 67 informs the user of timing for generating the backup data 8 effective for restoring the robot controller 5 and supports the generation of the backup data 8. As a result, the effective backup data 8 can be generated. Even when a program or the like is lost in the robot controller 5, it is easy to restore the robot controller 5 to an effective state.

The robot management system 100 according to this embodiment includes the robot controller 5, which is a control device including the robot control section 52 configured to control the robot 1, the program storing section 53 configured to store a program for controlling the robot 1, and the backup generating section 55 configured to generate the backup data 8 of the program, and the controller managing device 6, which is a managing device coupled to the robot controller 5 and configured to manage the robot controller 5. The controller managing device 6 includes the data acquiring section 63, which is an acquiring section configured to acquire generation time when the backup generating section 55 generates the backup data 8, and the display control section 66 configured to cause the display section 67 to display notification content when a difference between the generation time and present time is equal to or larger than a first predetermined value.

With such a robot management system 100, the effective backup data 8 can be generated. Even when a program or the like is lost in the robot controller 5, it is easy to restore the robot controller 5 to an effective state.

The controller managing device 6 determines, based on the notifications 7 from the robot controllers 5, presence or absence of necessity of the backup processing. Consequently, for example, since it is also easy to change the first predetermined value for each of the robot controllers 5, it is possible to realize the robot management system 100 having high setting flexibility.

2. Second Embodiment

A second embodiment is explained.

Figure 7:
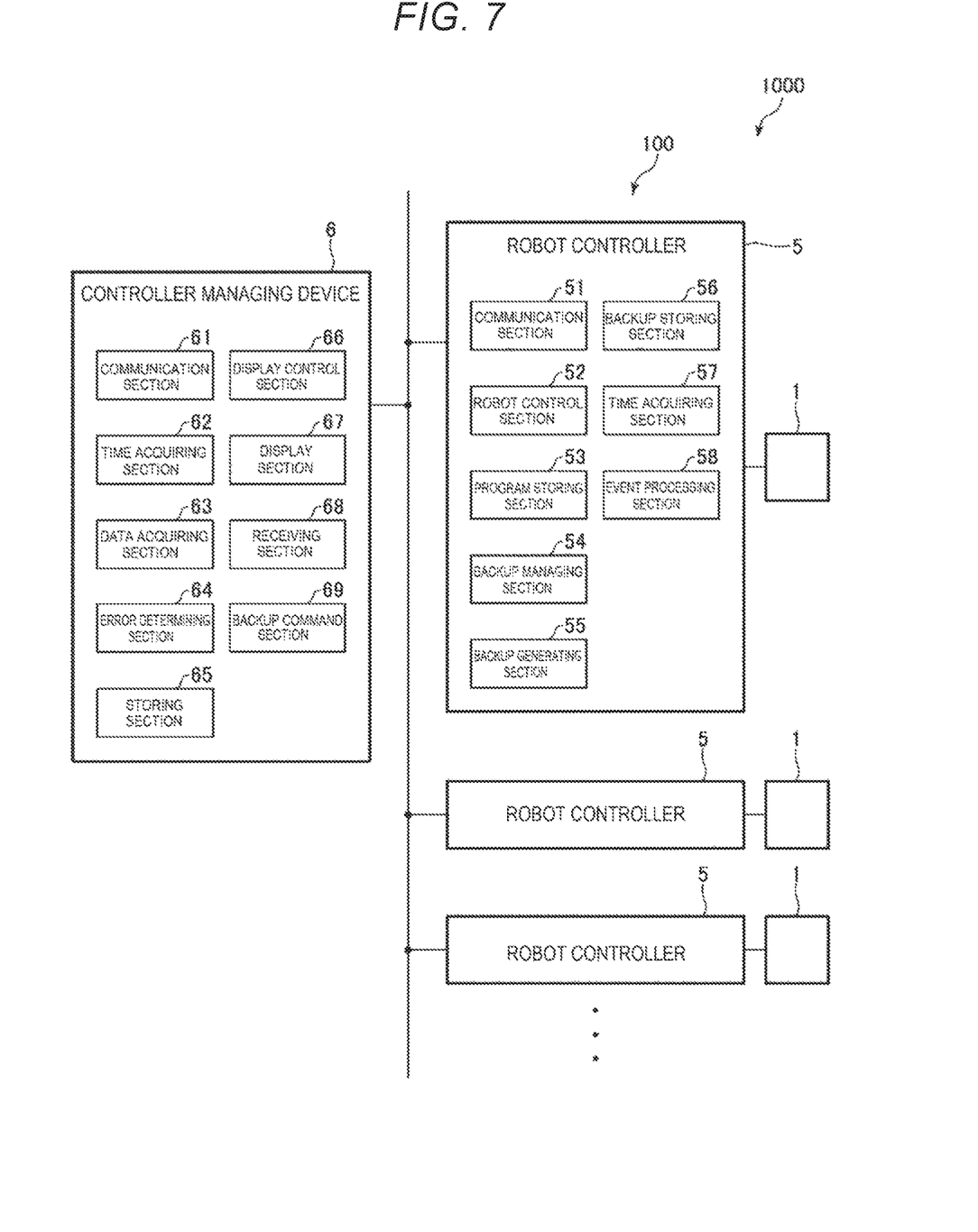
FIG. 7 is a functional block diagram showing a robot management system according to a second embodiment.
Figure 8:
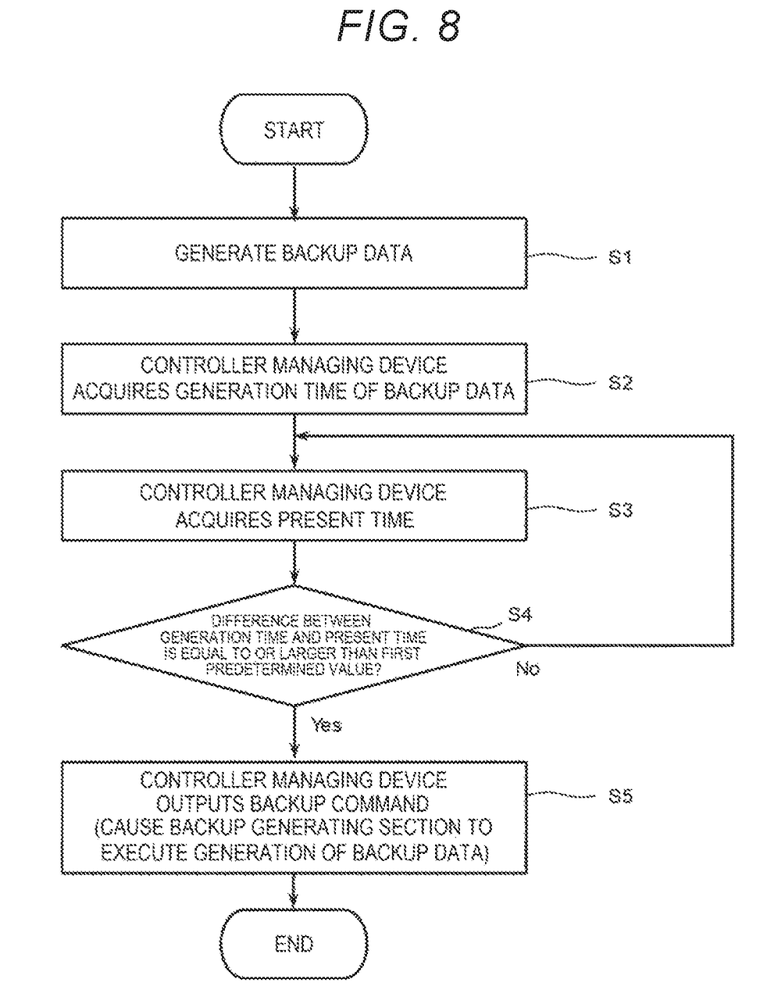
FIG. 8 is a flowchart showing a control method for the robot management system according to the second embodiment.

FIG. 7 is a functional block diagram showing a robot management system according to a second embodiment. FIG. 8 is a flowchart showing a control method for the robot management system according to the second embodiment.

The second embodiment is explained below. In the following explanation, differences from the first embodiment are mainly explained. Explanation about similarities to the first embodiment is omitted. In FIGS. 7 and 8, the same components as the components in the first embodiment are denoted by the same reference numerals and signs.

In the first embodiment explained above, the display control section 66 causes the display section 67 to display the notification content to thereby urge the user to perform the update work for the backup data 8. However, in this embodiment, the update work for the backup data 8 is performed based on a command from the controller managing device 6.

Specifically, the controller managing device 6 shown in FIG. 7 includes a backup command section 69. The backup command section 69 outputs, based on backup time error information generated by the error determining section 64, a backup command to the relevant robot controller 5. The backup command is data including an ID peculiar to the robot controller 5 and an execution instruction for backup processing. The backup command is processed in the event processing section 58 of the relevant robot controller 5. The event processing section 58 outputs, based on content of the backup command, to the backup generating section 55, backup generation information for causing the backup generating section 55 to generate the backup data 8. The backup generating section 55 generates new backup data 8.

As explained above, the robot management system 100 includes the robot controller 5, which is a control device including the robot control section 52 configured to control the robot 1, the program storing section 53 configured to store a program for controlling the robot 1, and the backup generating section 55 configured to generate the backup data 8 of the program, and the controller managing device 6, which is a managing device coupled to the robot controller 5 and configured to manage the robot controller 5. The controller managing device 6 includes the data acquiring section 63, which is an acquiring section configured to acquire generation time when the backup generating section 55 generates the backup data 8, and the backup command section 69, which is an executing section configured to, when a difference between the generation time and present time is equal to or larger than a first predetermined value, cause the backup generating section 55 to execute generation of new backup data 8.

With such a robot management system 100, effective backup data 8 can be generated. Even when a program or the like is lost in the robot controller 5, it is easy to restore the robot controller 5 to an effective state. In particular, when it is determined as a result of the determination in the error determining section 64 that the backup processing is necessary, it is possible to cause the robot controller 5 to automatically perform the backup processing. Therefore, it is possible to reduce a burden on the user and more surely generate the backup data 8.

A control method for the robot management system 100 according to the second embodiment is explained with reference to FIG. 8.

First, steps S1 to S4 in FIG. 8 are the same as the steps in the first embodiment.

When the difference between the generation time of the backup data 8 and the present time is equal to or larger than the first predetermined value as a result of the determination in step S4, the processing shifts to step S5. In step S5 in FIG. 8, the backup command section 69 of the controller managing device 6 outputs a backup command to the event processing section 58 of the robot controller 5. In other words, the backup command section 69 causes the backup generating section 55 to execute generation of the backup data 8. Consequently, the backup generating section 55 generates new backup data 8.

As explained above, the control method for the robot management system 100 according to this embodiment is a method of controlling the robot management system 100 including the robot controller 5, which is a control device configured to control the robot 1, and the controller managing device 6, which is a managing device coupled to the robot controller 5 and configured to manage the robot controller 5. The control method includes step S1 in which the robot controller 5 generates the backup data 8 of the program for controlling the robot 1, step S2 in which the controller managing device 6 acquires, from the robot controller 5, generation time when the backup data 8 is generated, and step S5 in which, when a difference between the generation time and present time is equal to or larger than a first predetermined value, the controller managing device 6 causes the robot controller 5 to execute generation of new backup data 8.

With such a control method, it is possible to automatically generate effective backup data 8. Even when a program or the like is lost in the robot controller 5, it is possible to easily and surely restore the robot controller 5 to an effective state.

Further, when the backup generating section 55 generates the backup data 8, the backup generating section 55 may generate the backup data 8 while the operation of the robot 1 is stopped. However, the backup generating section 55 may output, to the robot control section 52, stop instruction information for stopping the operation of the robot 1. Consequently, it is possible to stop the operation of the robot 1 at any timing. It is easy to generate the backup data 8.

In this case, the operation of the robot 1 is automatically stopped following the generation of the backup data 8. However, the user may instruct the robot 1 to stop the operation. In other words, the controller managing device 6 according to this embodiment may have two operation modes, that is, a "semiautomatic mode" in which update work for the backup data 8 is automatically started and, on the other hand, the user stops the operation of the robot 1 and a "full automatic mode" in which the update work is automatically started and the operation of the robot 1 is also automatically stopped.

Besides, in the second embodiment explained above, the same effects as the effects in the first embodiment are obtained.

The configuration of the first embodiment may be added to the second embodiment. In other words, the controller managing device 6 may cause the robot controller 5 to generate new backup data 8 and, on the other hand, cause the display section 67 to display the notification content.

3. Third Embodiment

A third embodiment is explained.

Figure 9:
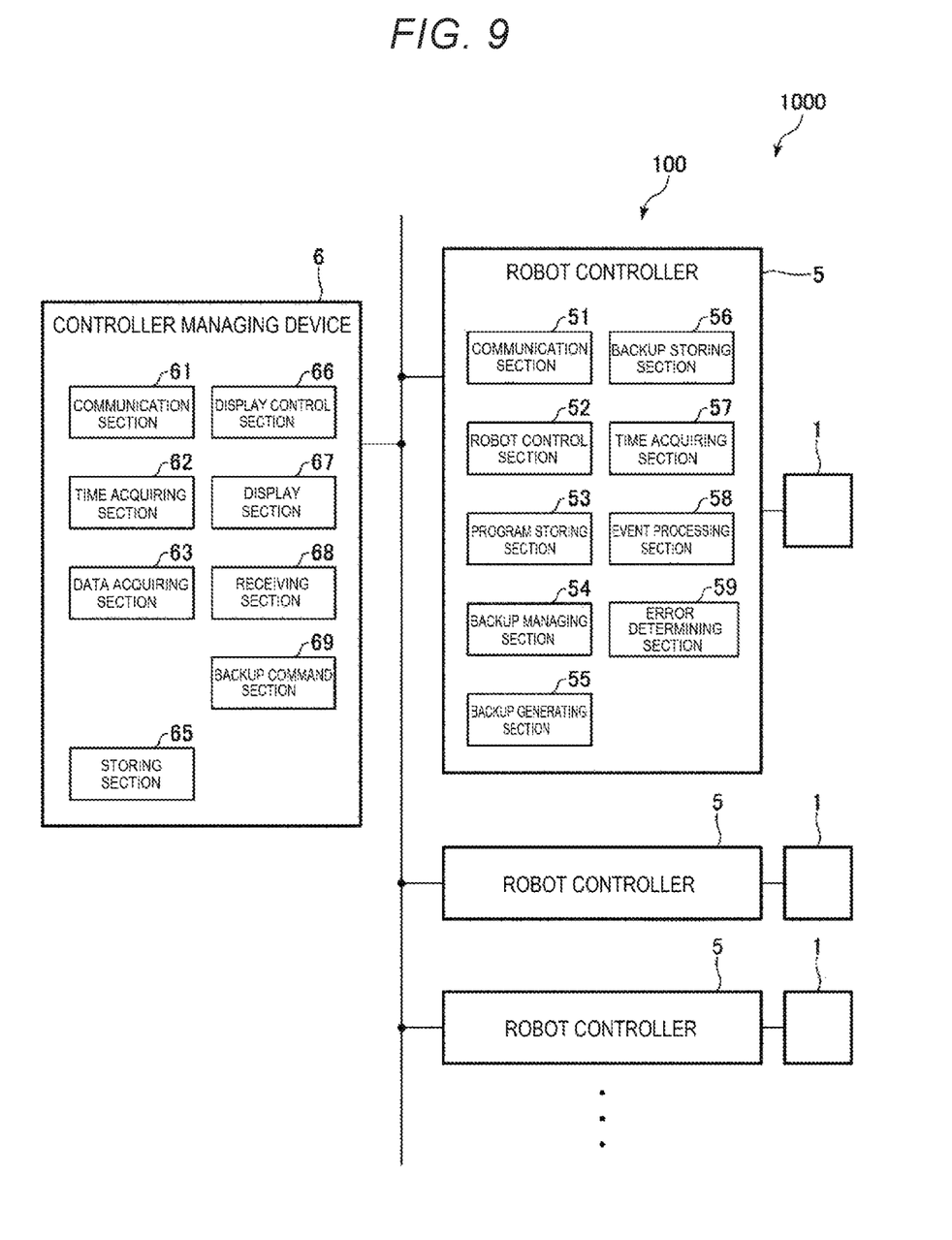
FIG. 9 is a functional block diagram showing a robot management system according to a third embodiment.
Figure 10:
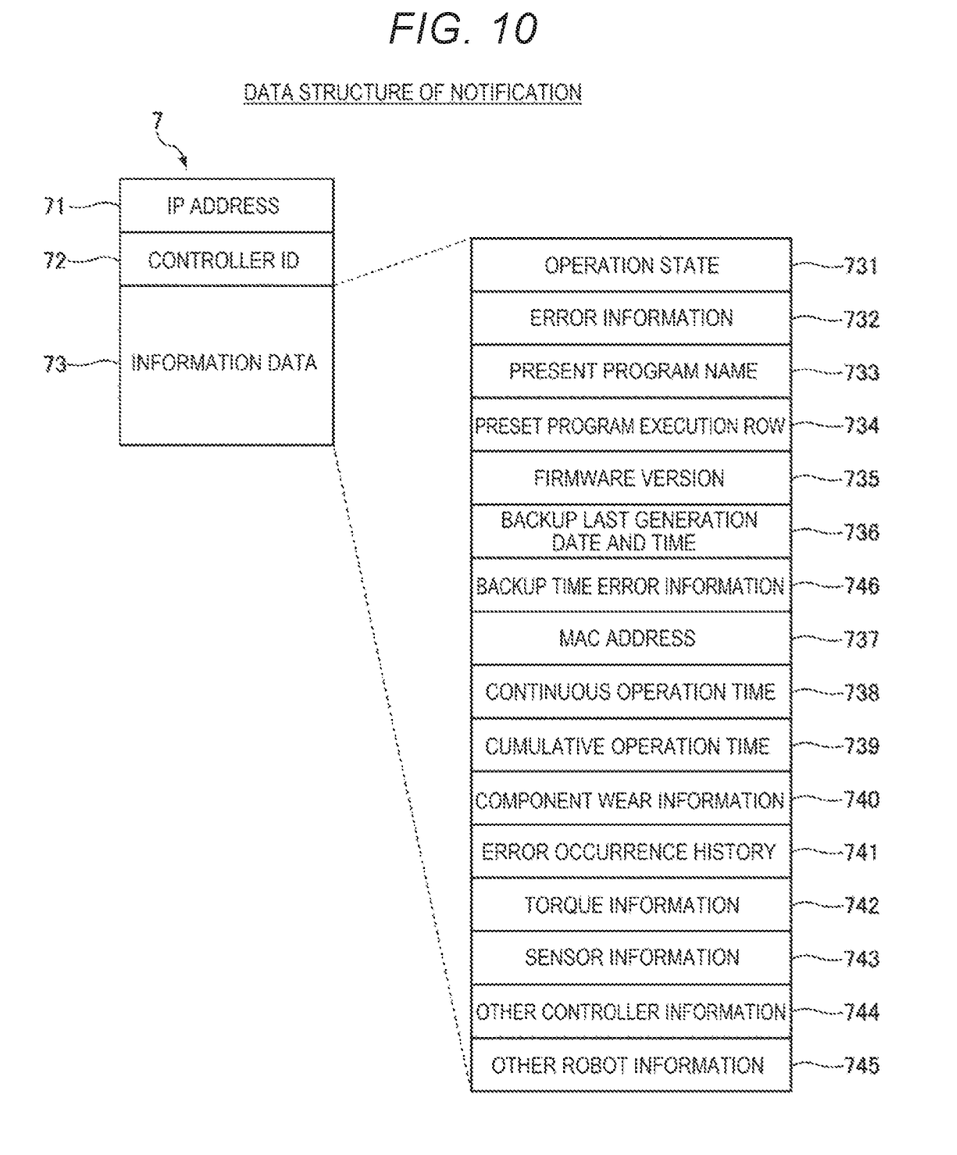
FIG. 10 is a conceptual diagram showing an example of content of a notification acquired by a controller managing device.

FIG. 9 is a functional block diagram showing a robot management system according to a third embodiment. FIG. 10 is a conceptual diagram showing an example of content of the notification 7 acquired by the controller managing device 6.

The third embodiment is explained below. In the following explanation, differences from the second embodiment are mainly explained. Explanation about similarities to the second embodiment is omitted. In FIG. 9, the same components as the components in the second embodiment are denoted by the same reference numerals and signs.

Whereas the controller managing device 6 includes the error determining section 64 in the second embodiment, in this embodiment, as shown in FIG. 9, the robot controller 5 includes an error determining section 59. Accordingly, whereas the error determining section 64 of the controller managing device 6 determines necessity of the backup processing based on the notifications 7 output from the robot controllers 5, in this embodiment, the error determining section 59 of the robot controller 5 assumes this function. The notification 7 output from the robot controller 5 to the controller managing device 6 includes, as shown in FIG. 10, a determination result in the error determining section 59, that is, backup time error information 746.

Then, the backup command section 69 of the controller managing device 6 according to this embodiment outputs a backup command to the relevant robot controller 5 based on the backup time error information 746. The backup command is processed in the event processing section 58 of the relevant robot controller 5. The event processing section 58 outputs, based on content of the backup command, to the backup generating section 55, backup generation information for causing the robot controller 5 to generate the backup data 8. The backup generating section 55 generates the backup data 8.

Besides, in the third embodiment explained above, the same effects as the effects in the second embodiment are obtained.

In this embodiment, when the plurality of robot controllers 5 are coupled to the controller managing device 6, the robot controllers 5 include error determining sections 59. Accordingly, since congestion of error determination processing less easily occurs, for example, there is also an advantage that it is possible to more quickly generate the backup data 8.

The embodiments of the present disclosure are explained above. However, the present disclosure is not limited to the embodiments. The components of the sections can be replaced with any components having the same functions. Any other components may be respectively added to the robot management systems in the embodiments. Further, steps for any purposes may be added to the control methods for the robot management systems in the embodiments.

What is claimed is:

1. A robot management system comprising:
   a control device including: a robot control section configured to control a robot; a program storing section configured to store a program for controlling the robot; and a backup generating section configured to generate backup data of the program; and
   a managing device coupled to the control device and configured to manage the control device, wherein
   the managing device includes:
      an acquiring section configured to acquire generation time when the backup generating section generates the backup data; and
      a display control section configured to, when a difference between the generation time and present time is equal to or larger than a first predetermined value, cause a display section to display notification content,
   wherein the present time is acquired from an internal clock included in the managing device or from a time server via the Internet.

2. The robot management system according to claim 1, wherein the backup generating section generates the backup data when operation of the robot is stopped.

3. The robot management system according to claim 1, wherein the managing device includes a receiving section configured to receive the first predetermined value from an outside.

4. The robot management system according to claim 1, wherein
   the acquiring section has a function of acquiring at least one kind of information among a continuous operation time of the robot, a cumulative operation time of the robot, component wear information of the robot, an error occurrence history of the robot, torque information of the robot, and sensor information of the robot, and
   the managing device causes, based on the information acquired by the acquiring section, the backup generating section to change a period when the backup generating section generates the backup data.

5. The robot management system according to claim 4, wherein
   the acquiring section has a function of acquiring the information respectively at first time and second time after the first time, and
   the managing device compares the information acquired at the first time and the information acquired at the second time and, when a change amount of the information is equal to or larger than a second predetermined value, causes the backup generating section to change the period in which the backup generating section generates the backup data.

6. A control method for a robot management system including a control device configured to control a robot and a managing device coupled to the control device and configured to manage the control device, the control method comprising:
   the control device generating backup data of a program for controlling the robot;
   the managing device acquiring, from the control device, generation time when the backup data is generated; and
   when a difference between the generation time and present time is equal to or larger than a first predetermined value, the managing device causing a display section to display notification content, wherein the present time is acquired from an internal clock included in the managing device or from a time server via the internet.

7. A control method for a robot management system including a control device configured to control a robot and a managing device coupled to the control device and configured to manage the control device, the control method comprising:

the control device generating backup data of a program for controlling the robot;

the managing device acquiring, from the control device, generation time when the backup data is generated; and when a difference between the generation time and present time is equal to or larger than a first predetermined value, the managing device causing the control device to execute generation of a new version of the backup data, wherein the present time is acquired from an internal clock included in the managing device or from a time server via the internet.

* * * * *